United States Patent
Kim et al.

(10) Patent No.: US 8,899,714 B2
(45) Date of Patent: Dec. 2, 2014

(54) INKJET APPARATUS FOR DEPOSITING LIQUID CRYSTAL

(71) Applicant: Samsung Display Co., Ltd., Yongin, Gyeonggi-Do (KR)

(72) Inventors: Tae Gyun Kim, Seoul (KR); Seung-Yeon Chae, Hwaseong-Si (KR); Hyoung Sub Lee, Seoul (KR); Tae Woon Cha, Seoul (KR)

(73) Assignee: Samsung Display Co., Ltd., Yongin, Gyeonggi-Do (KR)

( * ) Notice: Subject to any disclaimer, the term of this patent is extended or adjusted under 35 U.S.C. 154(b) by 82 days.

(21) Appl. No.: 13/828,644

(22) Filed: Mar. 14, 2013

(65) Prior Publication Data

US 2014/0141682 A1    May 22, 2014

(30) Foreign Application Priority Data

Nov. 19, 2012   (KR) .......................... 10-2012-0130850

(51) Int. Cl.
*B41J 29/393* (2006.01)
*B41J 2/175* (2006.01)
*H01J 9/20* (2006.01)
*B41J 3/407* (2006.01)

(52) U.S. Cl.
CPC .............. *B41J 3/407* (2013.01); *B41J 2/17513* (2013.01); *H01J 9/205* (2013.01); *B41J 2/17593* (2013.01)
USPC ............................................. 347/14; 347/16

(58) Field of Classification Search
CPC .. B41J 29/377; B41J 2/14064; B67D 7/0484; H01L 41/0805; H02J 7/00
USPC ............................................. 347/19, 14, 107
See application file for complete search history.

(56) References Cited

U.S. PATENT DOCUMENTS

| | | | |
|---|---|---|---|
| 6,164,746 | A | 12/2000 | Akahira et al. |
| 6,227,647 | B1 | 5/2001 | Akahira et al. |
| 6,582,048 | B1 | 6/2003 | Akahira et al. |
| 6,758,550 | B2 | 7/2004 | Ito et al. |
| 8,328,312 | B2 | 12/2012 | Kwon et al. |
| 2003/0007033 | A1 | 1/2003 | Ito et al. |
| 2004/0246298 | A1 | 12/2004 | Ito et al. |

(Continued)

FOREIGN PATENT DOCUMENTS

| | | |
|---|---|---|
| CN | 1395119 A | 2/2003 |
| CN | 1575054 A | 2/2005 |

(Continued)

OTHER PUBLICATIONS

EP 0 832 745 A2 (For KR 10-0255361).

(Continued)

*Primary Examiner* — Tracie Y Green
(74) *Attorney, Agent, or Firm* — F. Chau & Associates, LLC

(57) ABSTRACT

An inkjet apparatus for depositing liquid crystal according to an exemplary embodiment of the present invention includes: an inkjet head configured to discharge liquid crystal; a liquid crystal reservoir configured to provide the liquid crystal to the inkjet head, and the liquid crystal reservoir comprises metal; a storing tank configured to supply the liquid crystal to the liquid crystal reservoir; and a heat supply device configured to supply heat to the liquid crystal reservoir, in which a separation part is disposed inside of the liquid crystal reservoir, and the separation part divides the liquid crystal reservoir into an upper storing space and a lower storing space.

20 Claims, 6 Drawing Sheets

(56) References Cited

U.S. PATENT DOCUMENTS

| | | |
|---|---|---|
| 2005/0008769 A1 | 1/2005 | Sakai |
| 2011/0043564 A1 | 2/2011 | Park et al. |
| 2011/0063360 A1 | 3/2011 | Song et al. |
| 2011/0122207 A1 | 5/2011 | Shin et al. |

FOREIGN PATENT DOCUMENTS

| | | |
|---|---|---|
| CN | 1715965 A | 1/2006 |
| CN | 1717134 A | 1/2006 |
| CN | 1721087 A | 1/2006 |
| CN | 1250986 C | 4/2006 |
| CN | 100343702 C | 10/2007 |
| CN | 100355507 C | 12/2007 |
| CN | 100411223 C | 8/2008 |
| CN | 100433406 C | 11/2008 |
| DE | 69722739 | 4/2004 |
| DE | 69724371 | 7/2004 |
| EP | 0 832 744 A2 | 1/1998 |
| EP | 0 832 745 A2 | 1/1998 |
| JP | 07-092615 | 4/1995 |
| JP | 08-177880 | 7/1996 |
| JP | 10-151766 | 6/1998 |
| JP | 10-151773 | 6/1998 |
| JP | 11-020168 | 1/1999 |
| JP | 2963072 | 8/1999 |
| JP | 2003-084125 | 3/2003 |
| JP | 2003-084126 | 3/2003 |
| JP | 2004-358299 | 12/2004 |
| JP | 4208332 | 10/2008 |
| JP | 4311084 | 5/2009 |
| JP | 2009-169415 | 7/2009 |
| JP | 4590388 | 9/2010 |
| JP | 2012-020469 | 2/2012 |
| KR | 10-1998-025103 | 7/1998 |
| KR | 10-0233634 | 12/1999 |
| KR | 10-0255361 | 6/2000 |
| KR | 10-2003-0004139 | 1/2003 |
| KR | 10-0449796 | 9/2004 |
| KR | 10-2004-0103499 | 12/2004 |
| KR | 10-2006-0038275 | 5/2006 |
| KR | 10-2006-0044245 | 5/2006 |
| KR | 10-0643643 | 11/2006 |
| KR | 10-1083777 | 11/2011 |
| KR | 10-1109923 | 1/2012 |
| TW | 561106 | 11/2003 |
| TW | I266951 | 11/2006 |

OTHER PUBLICATIONS

EP 0 832 744 A2 (For KR-10-0233634).
EP 0 832 744 A2 (For 10-1998-025103).

in the United States Patent and Trademark Office.

INKJET APPARATUS FOR DEPOSITING LIQUID CRYSTAL

CROSS-REFERENCE TO RELATED APPLICATION

This application claims priority to and the benefit of Korean Patent Application No. 10-2012-0130850 filed in the Korean Intellectual Property Office on Nov. 19, 2012, the entire contents of which are incorporated herein by reference.

TECHNICAL FIELD

The present invention relates to an inkjet apparatus, and more particularly, to an inkjet apparatus for depositing liquid crystal.

DISCUSSION OF THE RELATED ART

A liquid crystal display (LCD) is a type of flat panel display currently in wide use. An LCD includes two display panels in which electric field generating electrodes, such as a pixel electrode and a common electrode, are formed A liquid crystal layer is interposed between the two display panels. The liquid crystal display generates an electric field in the liquid crystal layer by applying a voltage to the electric field generating electrodes. The nature of the electric field determines the orientation of liquid crystal molecules of the liquid crystal layer. By adjusting the electric field, a desired orientation of the liquid crystal molecules may be obtained and polarization of light incident upon the LCD controlled. By controlling the polarization of the incident light, a desired image may be displayed.

In manufacturing a liquid crystal display, the liquid crystal is injected between the two display panels. The liquid crystal is generally injected using a liquid crystal vacuum injection method or a liquid crystal drop method.

In the liquid crystal drop method, the liquid crystal is dropped on a substrate using an inkjet apparatus. In order to stably drop the liquid crystal, the liquid crystal should have a viscosity of about 10 cp. As liquid crystal at a room temperature has viscosity of about 20 cp or larger, viscosity of the liquid crystal may be decreased to the desired level by heating the liquid crystal. However, if the liquid crystal is not uniformly maintained at the desired temperature, defects may occur in the manufactured LCDs.

SUMMARY

Exemplary embodiments of the present invention provide an apparatus and approach to stably discharge liquid crystal from an inkjet apparatus.

An exemplary embodiment of the present invention provides an inkjet apparatus for depositing liquid crystal including an inkjet head configured to discharge liquid crystal. A liquid crystal reservoir is configured to inject the liquid crystal to the inkjet head. The liquid crystal reservoir comprises metal. A storing tank is configured to supply the liquid crystal to the liquid crystal reservoir. A heat supply device is configured to supply heat to the liquid crystal reservoir. A separation part is disposed inside of the liquid crystal reservoir. The separation part divides the liquid crystal reservoir into an upper storing space and a lower storing space.

The liquid crystal reservoir may include one or more surfaces, and the separation part may be spaced apart from one surface of the liquid crystal reservoir.

A plurality of heat transfer members may be disposed in the lower storing space.

The liquid crystal reservoir may include two surfaces facing each other. The heat transfer member may be in contact with one surface between the two surfaces facing each other. The heat transfer member may extend in a direction of a surface facing the surface of the liquid crystal reservoir with which the heat transfer member is in contact.

The surface of the liquid crystal reservoir with which the heat transfer member is in contact with may be spaced apart from the heat transfer member.

The heat supply device may be disposed under the liquid crystal reservoir.

The heat supply device may supply heat to the liquid crystal reservoir and the inkjet head.

A temperature sensor may be configured to measure a temperature of the liquid crystal inside the liquid crystal reservoir. A height sensor may be configured to measure a height of the liquid crystal inside the liquid crystal reservoir. The temperature sensor and height sensor may be disposed in the liquid crystal reservoir.

A pollution preventing layer may be disposed in an internal surface of the liquid crystal reservoir.

The pollution preventing layer may include Teflon.

The pollution preventing layer may include a parylene layer, and a self assembly monolayer containing fluorine disposed on the parylene layer.

The inkjet apparatus according to an exemplary embodiment of the present invention may further include a temperature adjusting device configured to adjust a temperature of the liquid crystal inside the liquid crystal reservoir, and a height adjusting device configured to adjust a height of the liquid crystal inside the liquid crystal reservoir.

According to an exemplary embodiment of the present invention, a temperature of the liquid crystal may be increased and uniformly maintained by dividing the inside of the liquid crystal reservoir into the upper storing space and the lower storing space, and arranging the plurality of heat transfer members in the lower storing space, thereby stably discharging the liquid crystal.

Further, heat is simultaneously supplied to the liquid crystal reservoir and the inkjet head by disposing the heat supply device under the liquid crystal reservoir, so that the liquid crystal may be uniformly maintained at a desired temperature, thereby stably discharging the liquid crystal.

Further, the metal material of the liquid crystal reservoir may be kept from reacting with the liquid crystal by disposing the pollution preventing layer in the internal surface of the liquid crystal reservoir.

A system for depositing liquid crystal includes a storage tank for storing liquid crystal. A reservoir receives the liquid crystal from the storage tank and stores the liquid crystal at a desired temperature. A discharge head discharges the liquid crystal stored in the reservoir. The reservoir includes a first primary section for providing the liquid crystal to the discharge head, a second primary section for maintaining the liquid crystal at the desired temperature, a separation part partially dividing the first and second primary sections, and one or more heat transfer members within the second primary section for providing heat to the liquid crystal.

The reservoir may further include a top surface, a bottom surface, a left surface, a right surface, a front surface and a back surface. The separation part may contact the reservoir at the front surface, the back surface and the left surface but not at the top surface, the bottom surface or the right surface.

The one or more heat transfer members might only contact the reservoir at the bottom surface. A heat supply device may supply heat to the reservoir and the discharge head. The reservoir may include metal.

At least one internal surface of the reservoir may be coated with a Teflon layer or a parylene layer and a self assembly monolayer containing fluorine disposed on the parylene layer.

A temperature adjusting device may be configured to adjust a temperature of the liquid crystal inside the reservoir, and a height adjusting device configured to adjust a height of the liquid crystal inside the reservoir.

A liquid crystal reservoir is configured to store liquid crystal at a desired temperature. The liquid crystal reservoir includes metal. A protective layer prevents the liquid crystal from reacting with the metal. A separation part is disposed inside of the liquid crystal reservoir and divides the liquid crystal reservoir into an upper storing space and a lower storing space. One or more heat transfer members within the second primary section provide heat to the liquid crystal.

BRIEF DESCRIPTION OF THE DRAWINGS

A more complete appreciation of the present disclosure and many of the attendant aspects thereof will be readily obtained as the same becomes better understood by reference to the following detailed description when considered in connection with the accompanying drawings, wherein.

DETAILED DESCRIPTION OF THE EXEMPLARY EMBODIMENTS

Figure 1:
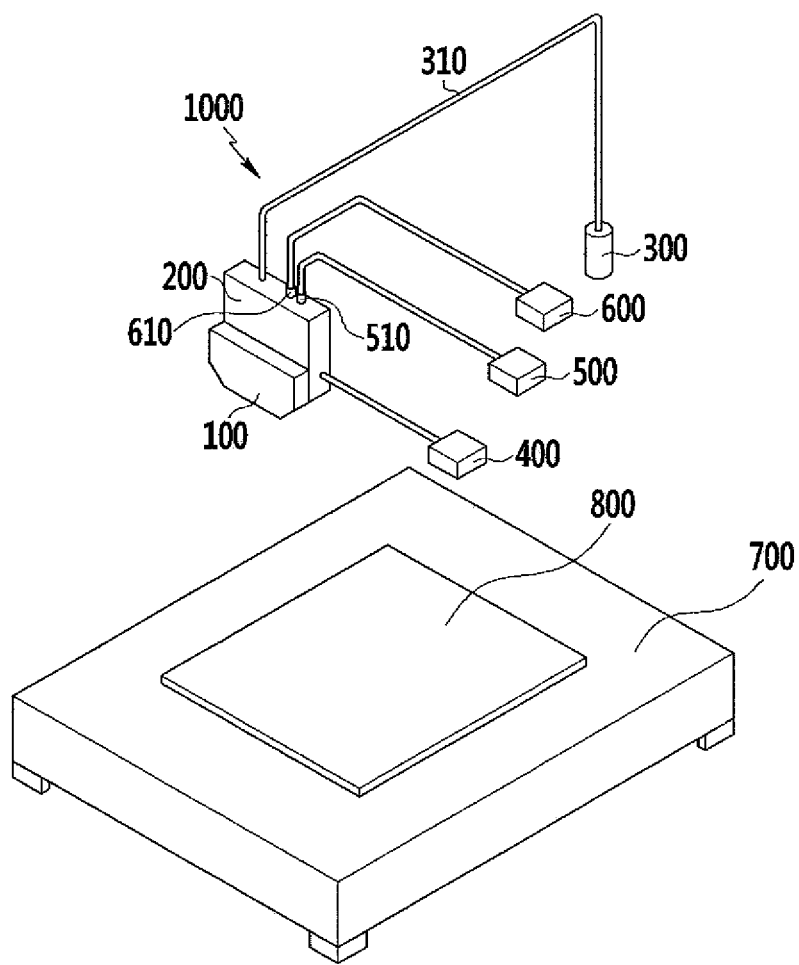
FIG. 1 is a perspective view of an inkjet printing system including an inkjet apparatus according to an exemplary embodiment of the present invention.

Hereinafter, exemplary embodiment of the present invention will be described in detail with reference to the accompanying drawings. As those skilled in the art would realize, the described embodiments may be modified in various different ways, all without departing from the spirit or scope of the present invention.

In the drawings, the thickness of layers, films, panels, regions, etc., may be exaggerated for clarity. It will be understood that when a layer is referred to as being "on" another layer or substrate, it can be directly on the other layer or substrate, or intervening structures may also be present. Like reference numerals may designate like elements throughout the specification.

FIG. 1 is a perspective view of an inkjet printing system including an inkjet apparatus according to an exemplary embodiment of the present invention.

As shown in FIG. 1, an inkjet printing system including the inkjet apparatus 1000 according to an exemplary embodiment includes a stage 700 on which a substrate 800 is mounted, and the inkjet apparatus 1000 spaced apart from the stage 700 at a predetermined interval such that the inkjet apparatus 1000 may drop liquid crystal onto the substrate 800.

The inkjet apparatus 1000 includes an inkjet head 100 for discharging liquid crystal on the substrate 800, a liquid crystal reservoir 200 for injecting liquid crystal to the inkjet head 100, and a storing tank 300 for supplying liquid crystal to the liquid crystal reservoir 200. Further, the inkjet apparatus 1000 includes a heat supply device 400 for supplying heat to the ink reservoir 200, a temperature adjusting device 500 for adjusting a temperature of liquid crystal inside the ink reservoir 200, and a height adjusting device 600 for adjusting a height of liquid crystal inside the ink reservoir 200.

The inkjet head 100 is positioned over the stage 700 while being spaced apart from the stage 700, on which the substrate 800 is mounted, at a predetermined interval.

The liquid crystal reservoir 200 increases a temperature of liquid crystal by receiving heat from the heat supply device 400, maintains the temperature of the liquid crystal, and injects the liquid crystal to the inkjet head 100. The liquid crystal reservoir 200 is formed of a metal material having high heat transfer coefficient, and is positioned at a rear side of the inkjet head 100.

The storing tank 300 stores liquid crystal, and supplies the liquid crystal to the liquid crystal reservoir 200 through a liquid crystal supply pipe 310.

A temperature sensor 510 for measuring a temperature of the liquid crystal inside the liquid crystal reservoir 200 and a height sensor 610 for measuring height of the liquid crystal inside the liquid crystal reservoir 200 are disposed in the liquid crystal reservoir 200. The temperature sensor 510 is connected to the temperature adjusting device 500, and the height sensor 610 is connected to the height adjusting device 600.

The inkjet apparatus 1000 may further include a movement unit for moving the inkjet head 100 vertically and horizontally. Alternatively, the inkjet head 100 may remain stationary while the stage 700 is moved by the movement unit.

Hereinafter, a detailed structure of the inkjet reservoir of the inkjet apparatus according to an exemplary embodiment of the present invention will be described in detail with reference to FIGS. 2 to 4.

Figure 2:
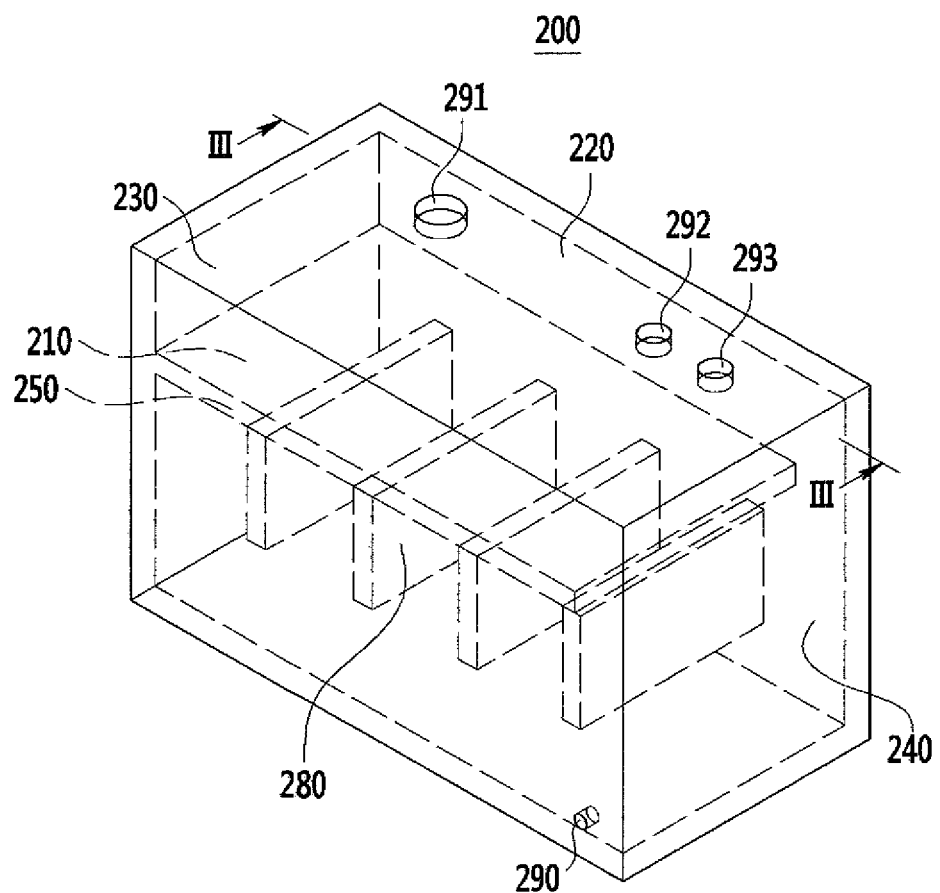
FIG. 2 is a perspective view of an inkjet reservoir according to an exemplary embodiment of the present invention.
Figure 3:
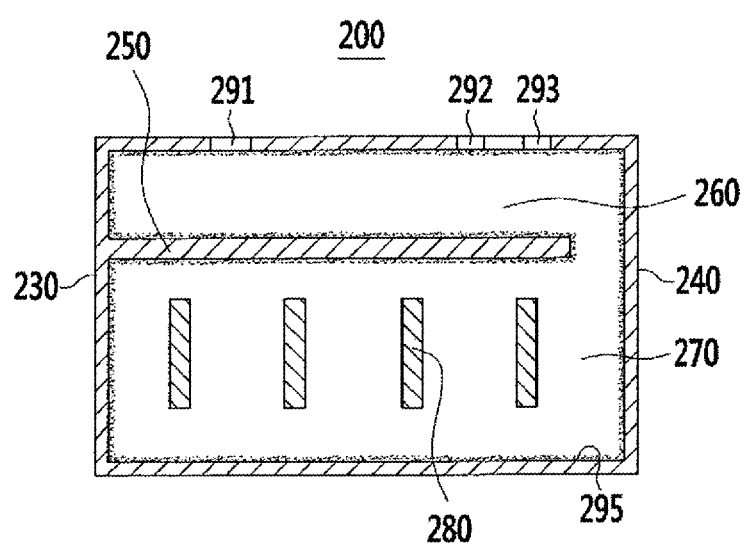
FIG. 3 is a cross-sectional view taken along line □-□ of the inkjet reservoir of FIG. 2.
Figure 4:
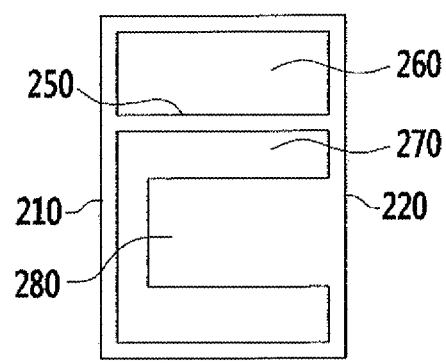
FIG. 4 is a side view of the inkjet reservoir of FIG. 2.

FIG. 2 is a perspective view of a liquid crystal reservoir according to an exemplary embodiment of the present invention, FIG. 3 is a cross-sectional view taken along line □-□ of FIG. 2, and FIG. 4 is a side view of FIG. 2.

The liquid crystal reservoir 200 according to an exemplary embodiment is shaped like a hexahedron including an upper surface and a lower surface facing the upper surface, and first to fourth surfaces 210, 220, 230, and 240 surrounding the upper surface and the lower surface. As it may not be clear from FIG. 2 on which surface each reference line is intended to fall on, it should be understood that the upper surface is the top surface, the lower surface is the bottom surface, the first surface 210 is left-front surface, the second surface 220 is the back-right surface, the third surface 230 is the back-left surface, and the fourth surface 240 is the front-right surface. The first surface 210 and the second surface 220 face each other, and the third surface 230 and the fourth surface 240 face each other. The first surface 210 is in contact with the inkjet head 100. According to an exemplary embodiment, it is described that the liquid crystal reservoir 200 has a hexahedral shape, but may have various shapes capable of storing liquid crystal.

A liquid crystal supply port 291, a height sensor port 292, and a temperature sensor port 293 are formed on the upper surface of the liquid crystal reservoir 200. The liquid crystal supply unit 310 connected to the storing tank 300 is also connected to the liquid crystal supply port 291 and thereby supplies the liquid crystal to the liquid crystal reservoir 200. The temperature sensor 510 is positioned at the temperature sensor port 293 where it measures a temperature of the liquid crystal inside the liquid crystal reservoir 200, and the height sensor 610 is positioned at the height sensor port 292 where it measures a height of the liquid crystal inside the liquid crystal reservoir 200.

A separation part 250 is disposed inside the liquid crystal reservoir 200, and the inside of the liquid crystal reservoir 200 is divided into an upper storing space 260 and a lower storing space 270 by the separation part 250. The separation part 250 is made of a metal material, and is in contact with the first surface 210, the second surface 220, and the third surface 230, and is not in contact with the fourth surface 240. For example, the separation part 250 is spaced apart from the fourth surface 240, so that the liquid crystal may move from the upper storing space 260 to the lower storing space 270. The liquid crystal supplied through the liquid crystal supply port 291 moves the lower storing space 270 via the upper storing space 260.

A plurality of heat transfer members 280 is disposed in the lower storing space 270. The heat transfer member 280 is made of a metal material, and is in contact with the second surface 220, extends in a direction of the first surface 210, and is not contact with the first surface 210. For example, the heat transfer member 280 is spaced apart from the first surface 210.

A liquid crystal injection port 290 for injecting the liquid crystal to the inkjet head 100 is disposed in the first surface 210.

A temperature of the liquid crystal inside the lower storing space 270 is increased by receiving heat from the liquid crystal reservoir 200 which receives the head from the heat supply device 400. The heat transfer members 280 are disposed in the lower storing space 270, so that the temperature of the liquid crystal inside the lower storing space 270 may be increased more quickly. Further, the plurality of heat transfer members 280 is formed to uniformly maintain a temperature of the liquid crystal inside the lower storing space 270.

For example, a temperature of the liquid crystal is increased by the liquid crystal reservoir 200, and is uniformly maintained, so that the liquid crystal may be stably discharged.

As may be seen in FIG. 3, a pollution preventing layer 295 is coated on an internal surface of the liquid crystal reservoir 200. The pollution preventing layer 295 serves to prevent the metal material of the liquid crystal reservoir 200 from reacting with the liquid crystal inside the liquid crystal reservoir 200.

The pollution preventing layer 295 may include Teflon. For example, the internal surface of the liquid crystal reservoir 200 is coated with Teflon to form the pollution preventing layer 295.

The pollution preventing layer 295 may include parylene layer and a self assembly monolayer (SAM) containing fluorine disposed on the parylene layer. For example, the parylene layer is coated on the internal surface of the liquid crystal reservoir 200, and then the self assembly monolayer containing fluorine is formed on the parylene layer to form the pollution preventing layer 295 having a double layer structure.

An inkjet apparatus according to an exemplary embodiment of the present invention will be described with reference to FIGS. 5 and 6.

Figure 5:
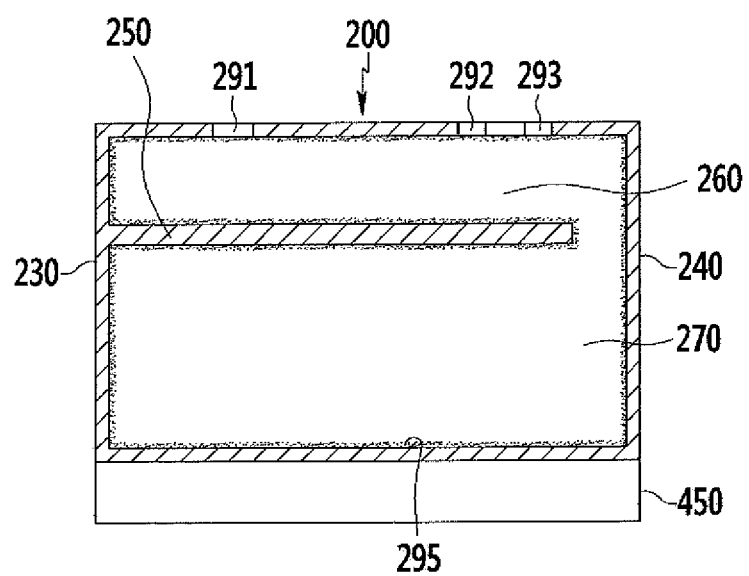
FIG. 5 is a cross-sectional view of an inkjet reservoir according to an exemplary embodiment of the present invention.
Figure 6:
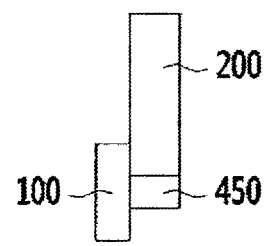
FIG. 6 is a view illustrating a state in which the inkjet reservoir according to FIG. 5 is attached to an inkjet head.

An internal structure of the inkjet reservoir 200 and the position of the heat supply apparatus 400 within the inkjet apparatus of FIGS. 5 and 6 are different from the internal structure of the inkjet reservoir 200 and the position of the heat supply apparatus of FIGS. 1-4, however the remaining structures may be the same. Therefore, a description of the same structure will be omitted.

FIG. 5 is a cross-sectional view of an inkjet reservoir according to an exemplary embodiment of the present invention, and FIG. 6 is a view illustrating a state in which the inkjet reservoir according to FIG. 5 is attached to an inkjet head.

Referring to FIGS. 5 and 6, an inkjet reservoir 200 is divided into an upper storing space 260 and a lower storing space 270 by a separation part 250. The separation part 250 is made of a metal material, and is in contact with a first surface 210, a second surface 220, and a third surface 230, and is not contact with a fourth surface 240. For example, there is a space between the separation part 250 and the fourth space 240, so that the liquid crystal may move from the upper storing space 260 to the lower storing space 270.

Contrary to the liquid crystal reservoir 200 illustrated in FIGS. 2 to 4, the heat transfer member 280 is not disposed in the lower storing space 270.

A liquid crystal reservoir 200 is disposed at the rear side of an inkjet head 100, and a heat supply device 400 is disposed under the liquid crystal reservoir 200.

The heat supply device 400 supplies heat to the lower storing space 270 of the liquid crystal reservoir 200 and uniformly maintains a desired temperature of the liquid crystal positioned in the lower storing space 270. For example, the liquid crystal of the upper storing space 260 may be maintained at a room temperature. Further, the heat supply device 400 supplies heat to the inkjet head 100.

For example, a desired temperature of the liquid crystal may be uniformly maintained and the liquid crystal may be stably discharged by supplying heat to the lower storing space 270 of the liquid crystal reservoir 200 and the inkjet head 100 by the single heat supply device 400.

A pollution preventing layer 295 serving to prevent the metal material of the liquid crystal reservoir 200 from reacting with the liquid crystal inside the liquid crystal reservoir 200 is coated on the internal surface of the liquid crystal reservoir 200.

The pollution preventing layer 295 may include Teflon. For example, the pollution preventing layer 295 is formed by coating the internal surface of the liquid crystal reservoir 200 with Teflon.

The pollution preventing layer 295 may include a parylene layer and a self assembly monolayer (SAM) containing fluorine may be disposed on the parylene layer. For example, the parylene layer is coated on the internal surface of the liquid crystal reservoir 200, and then the self assembly monolayer containing fluorine is formed on the parylene layer to form the pollution preventing layer 295 having a double layer structure.

While exemplary embodiments of the present invention invention have been described with reference to the figures, it is to be understood that the invention is not limited to the disclosed embodiments, but, on the contrary, is intended to cover various modifications and equivalent arrangements.

What is claimed is:

1. An inkjet apparatus for depositing liquid crystal, comprising:
   an inkjet head configured to discharge liquid crystal;
   a liquid crystal reservoir configured to provide the liquid crystal to the inkjet head, the liquid crystal reservoir comprises metal;
   a storing tank configured to supply the liquid crystal to the liquid crystal reservoir; and a heat supply device configured to supply heat to the liquid crystal reservoir, wherein a separation part is disposed inside of the liquid crystal reservoir, and wherein the separation part divides the liquid crystal reservoir into an upper storing space and a lower storing space.

2. The inkjet apparatus of claim 1, wherein the liquid crystal reservoir includes one or more surfaces, and the separation part is spaced apart from one surface of the liquid crystal reservoir.

3. The inkjet apparatus of claim 2, wherein a plurality of heat transfer members is disposed in the lower storing space.

4. The inkjet apparatus of claim 3, wherein the liquid crystal reservoir includes two surfaces facing each other, and the heat transfer member is in contact with one surface of the two surfaces facing each other, and extends in a direction of a surface facing the surface of the liquid crystal reservoir with which the heat transfer member is in contact.

5. The inkjet apparatus of claim 4, wherein the one surface of the two surfaces facing each other is spaced apart from the heat transfer member.

6. The inkjet apparatus of claim 2, wherein the heat supply device is disposed under the liquid crystal reservoir.

7. The inkjet apparatus of claim 6, wherein the heat supply device supplies heat to the liquid crystal reservoir and the inkjet head.

8. The inkjet apparatus of claim 1, wherein a temperature sensor is configured to measure a temperature of the liquid crystal inside the liquid crystal reservoir and a height sensor is configured to measure a height of the liquid crystal inside the liquid crystal reservoir, and both the temperature sensor and the height sensor are disposed in the liquid crystal reservoir.

9. The inkjet apparatus of claim 1, wherein a pollution preventing layer is disposed in an internal surface of the liquid crystal reservoir.

10. The inkjet apparatus of claim 9, wherein the pollution preventing layer includes Teflon.

11. The inkjet apparatus of claim 9, wherein the pollution preventing layer includes a parylene layer, and a self assembly monolayer containing fluorine disposed on the parylene layer.

12. The inkjet apparatus of claim 1, further comprising a temperature adjusting device configured to adjust a temperature of the liquid crystal inside the liquid crystal reservoir, and a height adjusting device configured to adjust a height of the liquid crystal inside the liquid crystal reservoir.

13. A system for depositing liquid crystal, comprising:
a storage tank for storing liquid crystal;
a reservoir for receiving the liquid crystal from the storage tank and storing the liquid crystal at a desired temperature; and
a discharge head for discharging the liquid crystal stored in the reservoir,
wherein the reservoir includes:
a first primary section for providing the liquid crystal to the discharge head;
a second primary section for maintaining the liquid crystal at the desired temperature;
a separation part partially dividing the first and second primary sections; and
one or more heat transfer members within the second primary section for providing heat to the liquid crystal.

14. The system of claim 13, wherein the reservoir further includes a top surface, a bottom surface, a left surface, a right surface, a front surface and a back surface and the separation part contacts the reservoir at the front surface, the back surface and the left surface but not at the top surface, the bottom surface or the right surface.

15. The system of claim 14, wherein the one or more heat transfer members only contact the reservoir at the bottom surface.

16. The system of claim 13, additionally including a heat supply device supplying heat to the reservoir and the discharge head.

17. The system of claim 13, wherein the reservoir includes metal.

18. The system of claim 13, wherein at least one internal surface of the reservoir is coated with a Teflon layer or a parylene layer and a self assembly monolayer containing fluorine disposed on the parylene layer.

19. The system of claim 13, further comprising a temperature adjusting device configured to adjust a temperature of the liquid crystal inside the reservoir, and a height adjusting device configured to adjust a height of the liquid crystal inside the reservoir.

20. A liquid crystal reservoir configured to store liquid crystal at a desired temperature, the liquid crystal reservoir comprising:
metal;
a protective layer preventing the liquid crystal from reacting with the metal;
a separation part is disposed inside of the liquid crystal reservoir dividing the liquid crystal reservoir into an upper storing space and a lower storing space; and
one or more heat transfer members within the second primary section for providing heat to the liquid crystal.

* * * * *